United States Patent [19]

Ebihara

[11] 4,419,413

[45] Dec. 6, 1983

[54] POWDER MOLDING METHOD AND POWDER COMPRESSION MOLDED COMPOSITE ARTICLE HAVING A REST-CURVE LIKE BOUNDARY

[75] Inventor: Tadashi Ebihara, Hatogaya, Japan

[73] Assignee: Nippon Piston Ring Co., Ltd., Tokyo, Japan

[21] Appl. No.: 351,563

[22] Filed: Feb. 23, 1982

[30] Foreign Application Priority Data

Feb. 26, 1981 [JP] Japan .................................. 56-26116

[51] Int. Cl.3 ........................... B22F 7/02; B22F 3/16; B32B 7/02; B32B 31/20

[52] U.S. Cl. .................................... 428/548; 428/550; 428/565; 164/412; 264/113; 419/2; 419/6; 419/7; 419/10; 425/78

[58] Field of Search ..................... 75/208 R, 214, 211, 75/222; 428/548, 550, 565; 264/111, 113; 419/6, 7, 10, 2; 164/412; 425/78

[56] References Cited

U.S. PATENT DOCUMENTS

| | | | |
|---|---|---|---|
| 2,208,054 | 7/1940 | Reed | 264/113 X |
| 2,753,858 | 7/1956 | Honeyman et al. | 428/566 X |
| 2,753,859 | 7/1956 | Bartlett | 428/539.5 |
| 3,198,856 | 8/1965 | Hammond et al. | 264/113 X |
| 3,391,444 | 7/1968 | Haller | 428/548 X |
| 3,666,456 | 5/1972 | Haller | 75/208 R |
| 3,752,003 | 8/1973 | Dunn et al. . | |
| 3,770,332 | 11/1973 | Dunn | 428/548 X |
| 3,938,814 | 2/1976 | Cromwell | 428/550 |

FOREIGN PATENT DOCUMENTS

| | | |
|---|---|---|
| 47-27814 | 10/1972 | Japan . |
| 51-39166 | 10/1976 | Japan . |
| 54-31963 | 10/1979 | Japan . |

OTHER PUBLICATIONS

Abstract, Japanese Patent Application Publication 54-23810.

*Primary Examiner*—Brooks H. Hunt
*Assistant Examiner*—Matthew A. Thexton
*Attorney, Agent, or Firm*—Sughrue, Mion, Zinn, Macpeak & Seas

[57] ABSTRACT

A powder compression molding method for producing a multilayer powder compression molded article having a plurality of different material layers disposed in a compression direction utilizes relative movements between an upper punch, a lower punch, a die having a step formed therein, and two feed shoes. The powder compression molded article thus formed requires a reduced amount of a special layer. The powder compression molding method includes forming a first space by moving the die relative to the lower punch, introducing a first powder into the first space through a first feed shoe, lowering the lower punch relative to the die to form a second space so that an upper surface of the first powder on the step of the die and on the lower punch has a nonuniform height, introducing a second powder into the second space, and moving the upper punch towards the lower punch to compress the first and second powders.

38 Claims, 28 Drawing Figures

30
31
21
2
3

6
A
21
2
3

A1
A
32
A2
21
2
3

B
7
A
21
3

5
33
22
21
2
3

1
23

POWDER MOLDING METHOD AND POWDER COMPRESSION MOLDED COMPOSITE ARTICLE HAVING A REST-CURVE LIKE BOUNDARY

BACKGROUND OF THE INVENTION

1. Field of the Invention

The present invention relates to a method for compression molding powder and a powder compression molded article made thereby. More particularly, it is concerned with a method for compression-molding powder to produce a molded article composed of a plurality of different material layers which are disposed in a compression direction, and a powder compression molded article produced thereby.

2. Description of the Prior Art

In powder metallurgy, mechanical parts having improved properties are produced at a low cost by using two kinds of powders.

Functional parts and structural members are generally produced by a method which comprises compression-molding powder into a predetermined form and firing or sintering the powder mold thus formed. This method is desirable and advantageous because the powder can be readily molded into any desired shape. Resin molded articles and sintered metal parts are produced by such powder compression molding methods. Generally, two layers consisting of different powder materials are arranged along the direction parallel to the pressurizing direction as described in Japanese patent publication no. sho-55-1961 and Japanese laid open application (OPI) No. sho-47-27814. Alternatively, two layers are arranged along the direction perpendicular to the pressurizing direction as disclosed in U.S. Pat. No. 2,753,858.

According to these methods, two kinds of powders are filled within the same die so that two powder layers can be subject to simultaneous pressure molding (compacting) to thus reduce production steps. However, in case complicated composite layers are to be molded as shown in U.S. Pat. No. 2,753,859, prior pressurization (compacting) of one of the powder layers is required.

In order to eliminate this additional process step, simultaneous pressure molding has been proposed wherein two kinds of powder materials are filled in the same die to integrally provide pressure molding and to provide a molded article having a complicated structure as disclosed in Japanese patent publication nos. 51-39166 and 54-31963. However, according to these methods, a plurality of lower punch means are required so that the punching means is weak in mechanical strength and complicated to operate. In addition, the mechanical wear of these punch means may degrade the dimensional accuracy of the resultant molded product.

As indicated, in powder compression molding, particularly in the production of functional parts, different materials are compression-molded in a multi-layer form to produce a molded article having special characteristics. This multi-layer construction is usually employed for the purpose of reducing material costs by using a special metal material or some other kind of special material for a predetermined layer or layers and an ordinary metal material or some other kind of ordinary material for the other layers. For example, in the case of a valve seat for use in an internal combustion engine, a composite sintered alloy is often used. The composite sintered alloy is composed of a high-alloyed sintered material and a low alloy sintered material. The high alloyed sintered material has good abrasion and corrosion resistance and is located on a valve spot surface of the valve seat and the low-alloyed sintered material forms the remaining portions of the valve seat. A composite material is also used when making resin parts for seals or bearings. The sliding surface of the resin part is made of a corrosion resistant or oil resistant material having a low coefficient of friction and the remainder of the resin portion is made of an ordinary material.

Such multi-layer powder compression molded articles have heretofore been produced most generally by a method and press machine shown in FIGS. 1(*a*) to (*d*). The press machine has a die 2, a lower punch 3, an upper punch 5 (FIG. 1(*c*)), a first feed shoe 6 (FIG. 1(*a*)) and a second feed shoe 7 (FIG. 1(*b*)). To produce an article according to the conventional method, a first powder A is introduced through the first feed shoe 6 by raising the die 2 relative to the lower punch 3 or lowering the lower punch 3 relative to the die 2. Then a second powder B is introduced through the second feed shoe 7 by again raising the die 2 relative to the lower punch 3 or lowering the lower punch 3 relative to the die 2. Thereafter, powder compression molding is effected with the upper punch 5 and the lower punch 3.

This method produces a valve seat as shown in FIG. 2(*a* ) and a resin seal ring 9 as shown in FIG. 3(*a*), each having a zone 81 or 91 made of a special material having specific desired characteristics.

The method shown in FIGS. 1(*a*)–1(*d*) inadequately reduces the volume of the special material required to produce the desired molded article and therefore does not adequately reduce the material costs.

In order to remove the foregoing defects in the abovementioned Japanese Patent Publication No. 39166/1976, a method is disclosed comprising the steps shown in FIGS. 4(*a*) to (*d*) using a press machine having a lower punch which comprises an inside lower punch 3A and an intermediate lower punch 3B. To make a molded article using this press machine, the inside lower punch 3A is first lowered to introduce a first powder A through a first feed show 6 and then the intermediate lower punch 3B is lowered to introduce a second powder B through a second feed shoe 7. Afterwards, an upper punch 5 is lowered to effect powder compression molding. This method permits one to obtain multi-layer powder compression molded articles as shown in FIG. 2(*b*) and FIG. 3(*b*) having only a part of the cross-section, i.e., the zone 81 or 91, made of the special material. However, as pointed out above, press machines having the above described double structure lower punches are mechanically weak in strength. Furthermore, when the inside lower punch and the intermediate lower punch do not fit in each other, satisfactory powder compression cannot be achieved and this impairs production stability. Also, since the lower punch comprises two punches 3A and 3B, the lower punch becomes complicated to operate and troubles often occur.

SUMMARY OF THE INVENTION

Accordingly, an object of the present invention is to provide a multi-layer powder compression molded article having a plurality of different material layers disposed in a compression direction.

A further object is to provide a method for compression molding powder to produce a multi-layer powder compression molded article which requires that a reduced amount of a special material be used.

A yet further object is to provide a method of making such molded articles which is simplified, has fewer working steps, and is excellent in production.

The present invention, therefore, relates to a powder compression molding method for producing a multilayer powder compression molded article having a plurality of different materials disposed in a compression direction by utilizing relative movements of an upper punch, a lower punch, a die, two feed shoes and/or a core rod. More specifically, the method of the present invention comprises the steps of:

(1) forming a first space by means of the die and/or the core rod, and the lower punch, at least one of the die and the core rod being provided with a step in a compression direction, (2) introducing a first powder into the first space by means of a first feed shoe, (3) lowering the lower punch to form a second space so that the upper surface of the first powder on the step of the die or core rod and the upper surface of the first powder on the lower punch is slanted and falls continuously in a powder compression direction, (4) introducing a second powder into the second space, and (5) compressing the first and the second powders.

The article of the present invention is a powder compression molded article which has a plurality of different material layers disposed in a compression direction wherein the boundary between the different material layers is slanted. The height of the boundary along a direction perpendicular to the compression direction is similar to a part or whole of the rest curve of the first powder layer.

DESCRIPTION OF THE PREFERRED EMBODIMENTS

Figures 5A, 5B, 5C, 5D, 5E, 5F:
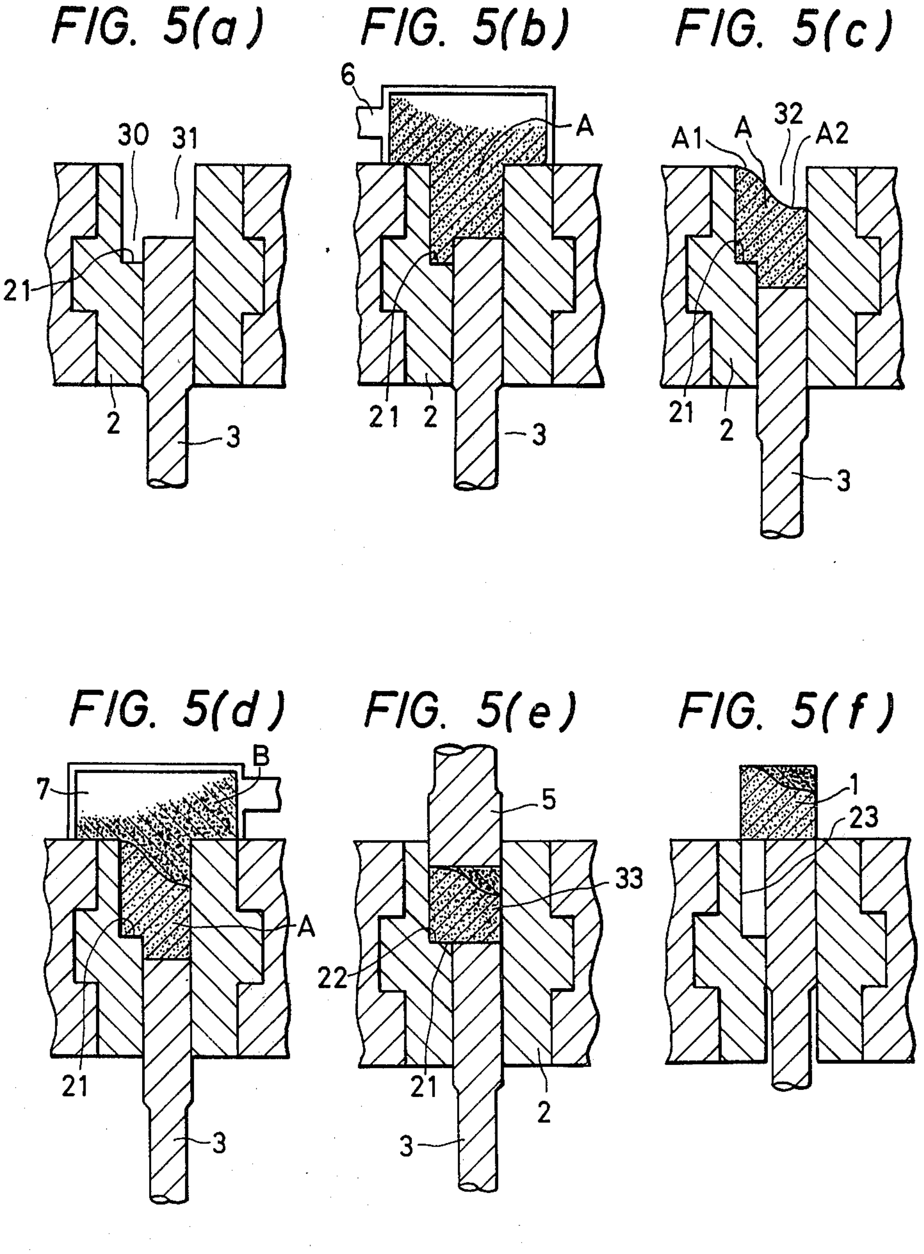
FIGS. 5(*a*) to (*f*) show a series of working steps, in cross-section, illustrating an embodiment of the method of the present invention.
Figure 6A:
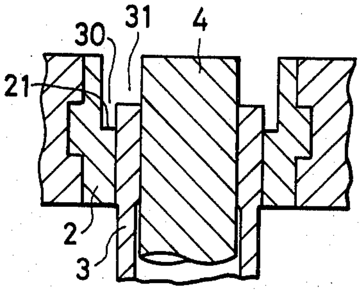
FIGS. 6(*a*) to (*f*) show a series of working steps, in cross-section, illustrating another embodiment of the method of the present invention.
Figure 6B:
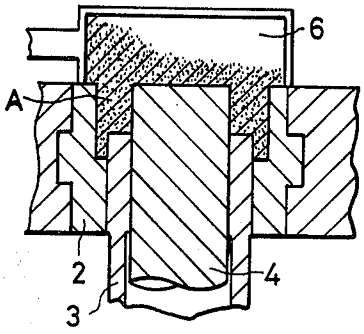
Figure 6C:
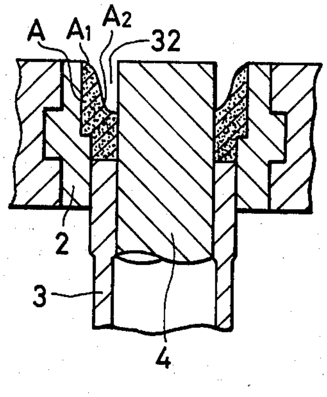
Figure 6D:
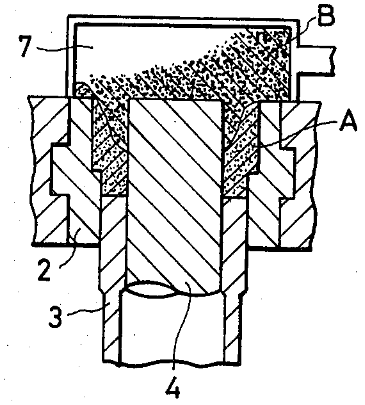
Figure 6E:
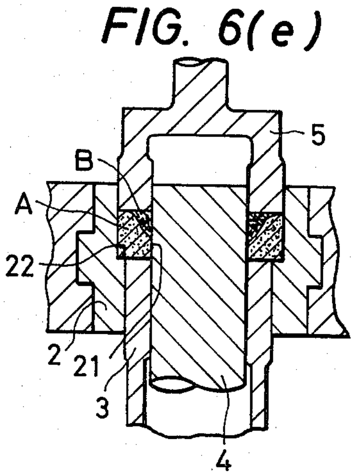
Figure 6F:
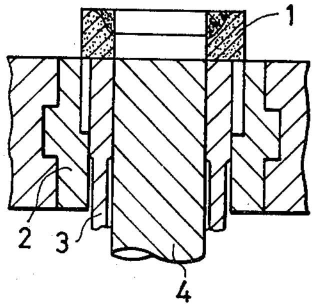

The powder compression molding method of the invention comprises the working steps shown in FIGS. 5 or 6.

Figure 7:
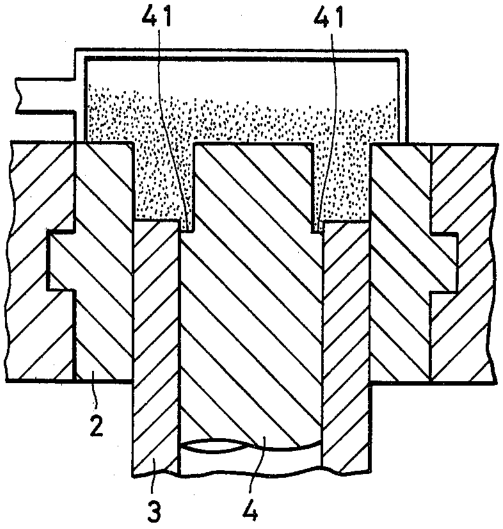
FIG. 7 shows a press machine having a core rod with a step formed therein.

According to the method of the present invention, at least one of a die 2 (FIGS. 5 and 6) and a core rod 4 (FIG. 6) has a step 21 (FIGS. 5 and 6) and/or 41 (FIG. 7) in a compression direction.

The molding method of the invention can be summarized as follows:

1st Step: (FIGS. 5(*b*) and 6(*b*)) A first powder A is introduced through a first feed shoe 6 into a first space 31 including an intrinsic space 30 defined by a die step between a die 2 and a lower punch 3 and into a space 31 formed by relative downward movement of a lower punch 3.

2nd Step: (FIGS. 5(*c*) and 6(*c*)) The lower punch 3 is lowered relative to the die 2 to form a second space 32 so that the top surface A1 of the first powder positioned above the step 21 or 41 of the die 2 or core rod 4 and the top surface A2 of the first powder positioned above the lower punch 3 describes a curve which falls gradually along a direction perpendicular to a compression direction.

3rd Step: (FIGS. 5(*d*) and 6(*d*)) A second powder B is introduced into the second space 32 through a second feed shoe 7.

4th Step: (FIGS. 5(*e*) and 6(*e*)) The first and second powders A and B are compression molded.

One embodiment of the method of the invention comprises the steps shown in FIG. 5 and another embodiment of the invention comprises the steps shown in FIG. 6.

Specifically, the method shown in FIG. 5 comprises the following six steps:

1st Step: (FIG. 5(*a*)) A die 2 is raised or a lower punch 3 is lowered to form a first space 31. The first space 31 includes an intrinsic space 30 defined by the step 21 of the die 2, the die 2 and the lower punch 3. The top of the lower punch 3 can be above or below the step 21.

The exact position of the lower punch 3 relative to the step 21 depends on the desired thickness of the first powder layer A and the desired thickness of the second powder layer B.

2nd Step: (FIG. 5(*b*)) A first powder A is introduced into the space 30, 31 through a first feed shoe 6.

In this step, the suction caused by the relative movement between the die 2 and the lower punch 3 can be utilized to introduce the first powder A into the first space 30, 31 by placing the first feed shoe 6 at a suction charging point prior to performing the first step. Alternatively, after the first step, charging can be performed.

3rd Step: (FIG. 5(*c*)) The die 2 is raised or the lower punch 3 is lowered to form a second space 32 above the top surface of the first powder A.

In this step, the top surface A1 of the first powder A positioned above the die step 21 is held at nearly the same height as the top surface of the die 2. However, the top surface A2 of the first powder positioned above the lower punch 3 is lowered by the relative downward movement of the lower punch 3. When the relative downward movement of the lower punch 3 is finished, a portion of the first powder A above the step 21 flows downward toward the lower punch. Thus, the top surface of the first powder A forms a curve. The shape of this curve can be controlled by controlling the distance the lower punch 3 is lowered and by controlling the speed of descent of the lower punch.

4th Step: (FIG. 4(*d*)) A second powder B is introduced into the second space 32 through a second feed shoe 7.

In this step, in order to prevent the top surface of the first powder A from collapsing and thus changing its shape, the second feed shoe 7 should be placed at a charging point after the 2nd step is completed. Thereafter, the lower punch 3 can be lowered to form the second space 32 and simultaneously the second powder B can be introduced into the second space 32 by the second feed shoe 7.

5th Step: (FIG. 5(*e*)) The upper punch 5 is lowered relative to the die 2 and the lower punch. In addition, after the upper punch 5 is lowered or while it is lowered, the lower punch 3 is raised relative to the step 21 to effect powder compression molding.

In this step, if the lower punch 3 is raised or the die 2 is lowered before the upper punch 5 reaches the top surface of the powder A, B, the powder A, B will overflow the top surface of the die 2. Therefore, the lower punch 3 should be raised relative to the step 21 simultaneously with or after the lowering of the upper punch 5. Furthermore, after the upper punch 5 reaches the top surface of the powder A, B, it is desired to compress the powder A, B between the upper punch 5 and the lower punch 3 by moving each of these punches 3, 5 at relatively equal speeds in order to obtain a uniform powder compression molded density. It is therefore desirable to operate the lower punch 3 or die 2 simultaneously with the upper punch 5.

Some functional parts or molded articles used in special applications have a structure wherein the layers A, B are parallel to each other in the compression direction. In producing powder compression molded articles having the foregoing structure, it is desirable that the die 2 be lowered after the upper punch 5 is lowered to the top surface of the powder. In addition, in some cases it is desired that the bottom surface of the step 21 of the die 2 be made level with the top surface 33 of the lower punch 3 by lowering the upper punch 5 and raising the lower punch 3, and when the level position is achieved, the operation of te die 2 or lower punch 3 is stopped and only the upper punch 5 is further lowered to complete the powder compression molding. By this procedure, the deviation between the amount of powder B above and below the step after the powder A, B is compressed is reduced and the formation of interfacial stress is easily minimized.

6th Step: (FIG. 5(*f*)) The die 2 is lowered relative to the lower punch 3 to remove the powder compression molded article 1.

In this case, when the step 21 is long in the powder compression direction and the direction perpendicular thereto, the friction between the inner surface 23 of the die 2 and the powder compression molded article 1 causes the formation of strains and cracks in the powder compression molded article 1. Therefore, the length in the powder compression direction and the direction perpendicular thereto of the step 21 is inevitably limited. This limited length is determined by the density and coefficient of friction of the powder and the height of the powder in the powder compression direction. It is desirable to increase the length of the step 21 to a relatively high level by providing a fine draft to the inner peripheral surface of the die 2.

The second method of the invention comprises the working steps shown in FIGS. (6(*a*) to (*f*). This method is different from the foregoing method shown in FIGS. 5(*a*) to (*f*) in that the second method uses a press machine which has a core rod 4. In other respects the second method is basically the same as the first method.

A powder compression molded article obtained by the second method is usually in the form of a ring. The point or points where the step 21 and/or 41 is provided varies depending on which section of the inner peripheral surface of the ring is to be made of the specific powder material B or which section of the outer peripheral surface of the ring is to made of the specific powder material B.

In the former case where a section of the inner peripheral surface is to be made of the specific powder material B, the step 21 is formed on the inner surface of te die 2. In the latter case where a section of the outer peripheral surface is to be made of the specific powder material B, the step 41 is formed on the outer surface of the core rod 4. If both the inner and outer peripheral surfaces of the ring are to be made of the specific powder material B, steps 21 and 41 are formed in both the die and the core rod.

Although the above description has been made with reference to the foregoing first and second methods, the present invention is not limited thereto. Referring to FIG. 5(*e*) or FIG. 6(*e*) for example, the lower punch 3 can be placed at a point higher than the top surface 22 of the step 21 to produce a molded article having a projection in the bottom thereof. On the other hand, the lower punch 3 can be placed at a point lower than the top surface 22 of the step 21 to produce a molded article having a recess in the bottom thereof. Of course, the shape of the lower punch 3, the upper punch 5 and the top surface 22 of the step should be appropriately selected so as to have a shape corresponding to the desired shape of the molded article.

The method of the invention can be carried out by the use of a molding press machine having a simplified structure. The press machine only requires an upper punch, a lower punch and a die. This simplified structure minimizes operating and maintenance problems, reduces accidents, and reduces the number of required working steps in forming the molded article. Thus the method of the invention is excellent for producing molded articles. Furthermore, since the thickness of the second powder layer B made of the specific material can be changed, it is possible to reduce the volume of the specific material which is required.

The present invention further relates to a powder compression molded article which can be easily made using the method of the invention as described hereinbefore.

The powder compression molded article of the invention has a boundary between the first powder layer and the second powder layer the shape of which is very similar to the rest curve of the first powder layer with one or both ends of the molded article being the vertex or vertexes of the boundary line.

Figure 8:
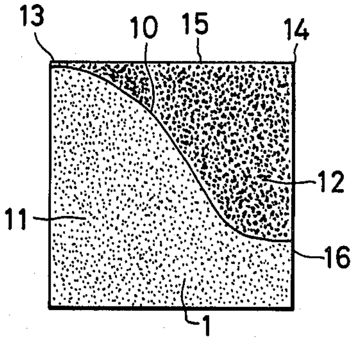
FIG. 8 is a cross-sectional view of an embodiment of the molded article of the invention.

Referring to FIG. 8, a powder compression molded article 1 of the invention is made of a multi-layer composite material comprising a first powder layer 11 and a second powder layer 12. There is almost no second powder layer 12 at an end 13 of the powder compression molded article 1. The boundary 10 between the first powder layer 11 and the second powder layer 12 gradually falls toward the other end 14 of the molded article 1 thereby defining a curve which is similar to the rest curve of the first powder 11. Therefore, the second powder layer 12 is thick at the end 14 of the powder compression molded article 1 and the second powder layer exists in a nearly triangular zone with the edge 14 of the second powder layer being a vertex of the triangular zone.

The powder compression molded article of the invention, when provided with a second powder layer 12 constituting a top surface 15 and a side surface 16, is very useful as a functional part.

Figure 9:
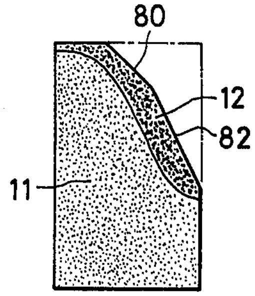
FIG. 9 is a cross-sectional view of another embodiment of the molded article of the invention.

Another embodiment of the powder compression molded article of the invention is a valve seat as illustrated in FIG. 9.

Figure 1A:
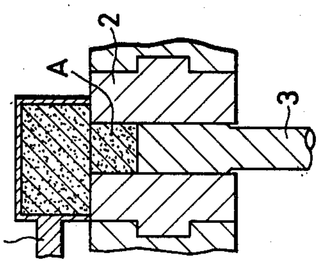
FIG. 1(a) PRIOR ART
FIGS. 1(*a*) to (*d*) show a series of working steps, in cross-section, illustrating a conventional powder compression molding method for producing molded articles as shown in FIGS. 2(*a*) and 3(*a*).
Figure 1B:
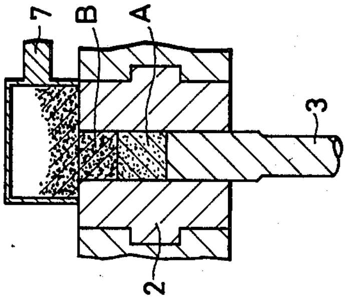
FIG. 1(b) PRIOR ART
Figure 1C:
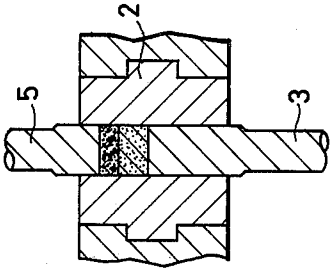
FIG. 1(c) PRIOR ART
Figure 1D:
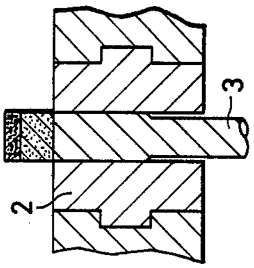
FIG. 1(d) PRIOR ART
Figure 2A:
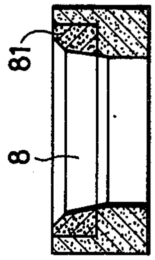
FIG. 2(a) PRIOR ART
FIGS. 2(*a*) and 2(*b*), 3(*a*) and 3(*b*) are cross-sectional views of conventional powder compression molded articles.
Figure 2B:
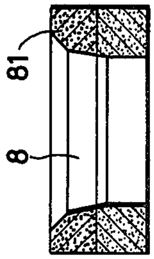
FIG. 2(b) PRIOR ART
Figure 3A:
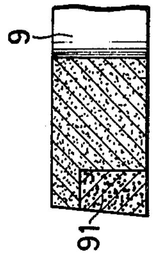
FIG. 3(a) PRIOR ART
Figure 3B:
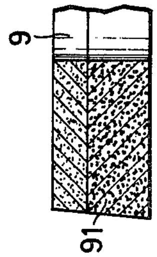
FIG. 3(b) PRIOR ART
Figure 4D:
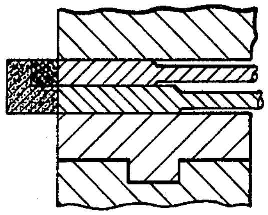
FIGS. 4(*a*) to (*d*) show a series of working steps, in cross-section, illustrating a conventional powder compression molding method for producing the molded articles as shown in FIGS. 2(*b*) and 3(*b*)
Figure 4C:
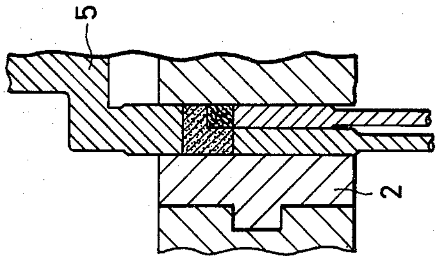
Figure 4B:
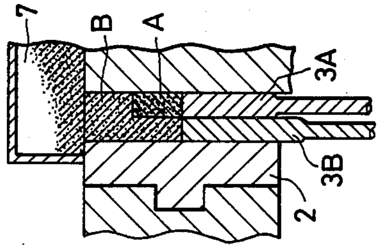
Figure 4A:
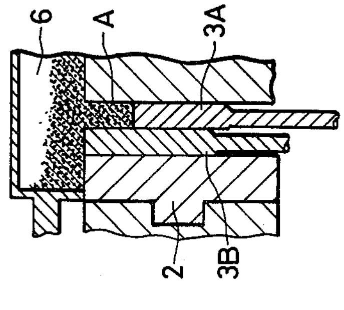

Referring to FIG. 9, a second powder layer 12 is formed in such a manner that it contains only a sliding surface 80 and an inner peripheral surface 82 where a heat load is high. Furthermore, the sliding surface 80 has a uniform depth. Therefore, as compared with the conventional molded articles, the layer B required for the valve seat of the present invention is much less than that required in the valve seats shown in FIGS. 2(*a*) and (*b*). The valve seat shown in FIG. 9 can be produced by compression molding the powder A, B in a rectangular form as indicated by the dotted line in FIG. 9 and then maching the molded product into the desired article shape shown by the solid line in this Figure. Alternatively, the powder can be compression molded into the ultimate article shown by the solid line in FIG. 9.

The article shown in FIG. 8, can be easily produced by the method of the invention shown in FIG. 5. However, it can be produced by other methods as well.

Figure 10:
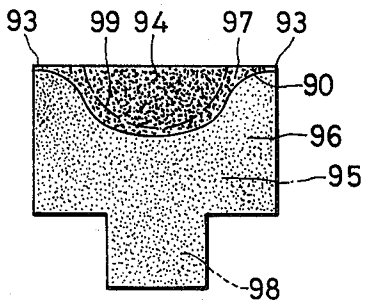
FIG. 10 is a cross-sectional view of yet a further embodiment of the molded article of the invention.

A third embodiment of the molded article of the invention is a thrust bearing 95 shown in FIG. 10. In the thrust bearing 95, a boundary 90 between a first powder layer 96 and a second powder layer 97 is highest at both ends 93 and lowest at a central point 94. The boundary 90 describes a curve similar to the rest curve of the first powder layer 96. A sliding surface 99 indicated by the dotted line is formed by working or is formed during powder compression molding. The second powder layer 97 made of the special material forms the sliding surface 99 and, therefore, the volume of the second powder layer can be minimized. The third embodiment of the molded article of the invention is produced, more preferably, by the method shown in FIG. 5 wherein a step 21 is provided on the entire inner periphery of the die 2. This molded article can be produced by other methods as well. Thus the invention is not limited to the methods of production as described hereinbefore. A projection 98 shown in FIG. 9 can be produced by the method shown in FIG. 5 wherein during the step (e) the lower punch 3 is stopped at a point lower than the top surface 22 of the step 21 and the powder compression molding is effected with the upper punch 5.

As described above, the molded article of the invention has a boundary between the first powder layer and the second powder layer which is similar to the rest curve of the first powder layer. Therefore, when it is used as a composite material for use in a special application, the volume of the second powder layer can be reduced and the second powder layer can be uniformly provided in the critical zone.

The molded article of the invention is not limited to the first to third embodiments as described above. For example, a powder compression molded article as shown in FIG. 10 can be used as a seal ring whose rip portion is made of the second powder and as a tappet for use in an internal combustion engine.

The powder compression molded article of the invention can be used after sintering and firing and in some cases may be subjected to post treatments such as infiltration, impregnation, sulfurization, nitrization and hardening.

What is claimed is:

1. A powder compression molding method for producing a multi-layer powder compression molded article having a plurality of different material layers disposed in a compression direction by utilizing relative movements of an upper punch, a lower punch, a die, and first and second feed shoes, the method comprising the steps of:

forming a first space between the die and the lower punch, the die having a step formed therein;

introducing a first powder into the first space;

lowering the lower punch relative to the die to form a second space above a top surface of the first powder;

introducing a second powder into the second space; and compressing the first and second powders to form the multi-layer powder compression molded article.

2. The method claimed in claim 1, wherein the step is formed on at least part of an inside surface of the die.

3. The method claimed in claim 2, wherein the step is formed on the entire inside surface of the die.

4. The method claimed in claim 2 wherein lowering the lower punch relative to the die forms the top surface of the first powder over the step of the die and over the lower punch, the top surface of the first powder having a non-uniform height in the compression direction.

5. The method claimed in claim 4, wherein a shape of the top surface is controlled by controlling the rate of relative descent and the total amount of relative descent between the lower punch and the die.

6. The method claimed in claim 5, wherein the first powder is introduced into the first space by the first feed shoe and the second powder is introduced into the second space by the second feed shoe.

7. The method claimed in claim 6, further comprising the step of removing the compression molded article by raising the upper punch relative to the die and the lower punch and then raising the lower punch relative to the die.

8. The method claimed in claim 7, further comprising the step of placing the first feed shoe at a suction charging point prior to the introduction of the first powder into the first space; and placing the second feed shoe at a second charging point prior to the introduction of the second powder into the second space.

9. The method claimed in claim 8, wherein the second powder is introduced into the second space simultaneously with the relative movement between the die and the lower punch when forming the second space.

10. The method claimed in claim 6, wherein the first and second powders are compressed by lowering the upper punch relative to the die and the lower punch.

11. The method claimed in claim 10, wherein the first and second powders are compressed by also raising the lower punch relative to the step.

12. The method claimed in claim 11, wherein a final position of a top surface of the lower punch is even with a bottom surface of the step after the first and second powders have been compressed.

13. The method claimed in claim 11, wherein a final position of a top surface of the lower punch is below a bottom surface of the step after the first and second powders have been compressed.

14. The method claimed in claim 11, wherein a final position of a top surface of the lower punch is above a bottom surface of the step after the first and second powders have been compressed.

15. The method claimed in claim 12, 13 or 14, wherein while compressing the first and second powders, the lower punch is raised and the upper punch is lowered simultaneously at approximately the same speed.

16. The method claimed in claim 12, 13 or 14, wherein while compressing the first and second powders, after the upper punch contacts the top surface of the second powder only the upper punch is moved to cause the powder compression.

17. A powder compression molding method for producing a multi-layer powder compression molded article having a plurality of different material layers disposed in a compression direction by utilizing relative movements of an upper punch, a lower punch, a die, a core rod, and first and second shoes, the method comprising the steps of:

forming a first space between the die, core rod, and the lower punch, at least one of the die and the core rod having a step formed therein;

introducing a first powder into the first space;

lowering the lower punch relative to the die and the core rod to form a second space above a top surface of the first powder;

introducing a second powder into the second space; and compressing the first and second powders to form the compression molded article.

18. The method claimed in claim 17, wherein the step is formed on at least part of an inside surface of the die.

19. The method claimed in claim 18, wherein an additional step is formed on at least part of an outside surface of the core rod.

20. The method claimed in claim 19, wherein the top surface of the first powder is highest in the compression direction at opposite sides of the molded article which are parallel to the compression direction, and the height of the top surface in the compression direction is smallest approximately midway between the opposite sides of the molded article.

21. The method claimed in claim 17, wherein lowering the lower punch relative to the die forms the top surface of the first powder over the at least one step and over the lower punch, the top surface having a non-uniform height in the compression direction.

22. The method claimed in claim 21 or 20, wherein a shape of the top surface of the first powder is controlled by controlling the rate of relative descent and the total amount of relative descent between the lower punch and the die.

23. The method claimed in claim 17, wherein the first powder is introduced into the first space by the first feed shoe and the second powder is introduced into the second space by the second feed shoe.

24. The method claimed in claim 23, wherein the first and second powders are compressed by lowering the upper punch relative to the die, the core rod and the lower punch, and the lower punch is raised relative to the step.

25. The method claimed in claim 24, wherein a final position of a top surface of the lower punch is even with the bottom surface of at least one of the steps after the powder compression.

26. The method claimed in claim 24, wherein a final position of a top surface of the lower punch is below a bottom surface of at least one of the steps after the powder compression.

27. The method claimed in claim 24, wherein a final position of a top surface of the lower punch is above a bottom surface of at least one of the steps after the powder compression.

28. The method claimed in claim 24, wherein while compressing the first and second powders, the lower punch is raised and the upper punch is lowered simultaneously at approximately the same speed.

29. The method claimed in claim 24, wherein while compressing the first and second powders, after the upper punch contacts the top surface of the second powder only the upper punch is moved to cause the powder compression.

30. The method claimed in claim 24, further comprising the step of removing the compression molded article by raising the upper punch relative to the die, the core rod and the lower punch, and then raising the lower punch relative to the die.

31. The method claimed in claim 23, further comprising the steps of placing the first feed shoe at a suction charging point prior to the introduction of the first powder into the first space; and placing the second feed shoe at a second charging point prior to the introduction of the second powder into the second space.

32. The method claimed in claim 31, wherein the first powder is introduced into the second space simultaneously with the relative movement between the die and the lower punch when forming the second space.

33. A powder compression molded article comprising a first and a second layer, the first and second layers comprising different materials, a boundary between the different material layers having a rest-curve like shape formed by relative movement between a punch and a die after said first layer in powder form is deposited on an upper surface of said punch and said die but prior to said second layer in powder form being deposited on said first powder layer.

34. The article claimed in claim 33, wherein said powder compression molded article comprises a metallurgical article.

35. The article claimed in claim 33, wherein the boundary layer in cross section is highest in the compression direction at opposite sides of the molded article which are parallel to the compression direction and the height of the boundary layer in the compression direction is smallest about midway between the opposite sides.

36. The article claimed in claim 35, wherein said powder compression molded article comprises a metallurgical article.

37. The article claimed in claim 33 wherein the second powder layer in cross section has a shape resembling a triangle with an edge of the second powder layer being a vertex of the triangle, the height of the second layer in the compression direction being smallest at a first side of the article and the height of the second layer continuously increasing and being largest at a second side of the molded article which is opposite to the first side, the first and second sides being parallel to the compression direction.

38. The article claimed in claim 37, wherein said powder compression molded article comprises a metallurgical article.

* * * * *